United States Patent [19]
Ishida et al.

[11] 3,903,197
[45] Sept. 2, 1975

[54] POLYACETAL COMPOSITION

[75] Inventors: Shinichi Ishida; Hiromichi Fukuda, both of Tokyo; Tadatoshi Matsuoka, Kawasaki, all of Japan

[73] Assignee: Asahi Kasei Kogyo Kabushiki Kaisha, Osaka, Japan

[22] Filed: Apr. 8, 1974

[21] Appl. No.: 459,186

Related U.S. Application Data

[63] Continuation-in-part of Ser. No. 349,466, April 9, 1973, abandoned, which is a continuation of Ser. No. 117,760, Feb. 22, 1971, abandoned.

[30] Foreign Application Priority Data
May 28, 1970 Japan.................................. 45-45171

[52] U.S. Cl..................... 260/857 R; 260/45.8 N; 260/45.85 P; 260/45.9 P; 260/45.9 R; 260/45.9 NC; 260/858
[51] Int. Cl............................................. C08g 41/04
[58] Field of Search.... 260/45.9 P, 45.8 N, 45.85 P, 260/45.9 R, 857 R, 858, 45.9 NC

[56] References Cited
UNITED STATES PATENTS

| | | | |
|---|---|---|---|
| 3,190,852 | 6/1965 | Doyle | 260/45.85 S |
| 3,337,504 | 8/1967 | Fisher | 260/45.95 R |
| 3,378,518 | 4/1968 | Doyle | 260/45.95 R |
| 3,530,091 | 9/1970 | Kitaoka et al. | 260/45.85 R |
| 3,743,614 | 7/1973 | Wolters et al. | 260/18 R |
| 3,787,353 | 1/1974 | Ishii et al. | 260/45.9 P |

*Primary Examiner*—Melvyn I. Marquis
*Attorney, Agent, or Firm*—Armstrong, Nikaido & Wegner

[57] ABSTRACT

A polyacetal composition having a good whiteness and an excellent heat stability comprises a polyacetal or copolyacetal; a hindered phenolic antioxidant; a nitrogen-containing compound; and a specified dihydroxydiphenyl or bisphenol.

31 Claims, No Drawings

POLYACETAL COMPOSITION

This application is a continuation-in-part application of application, Ser. No. 349,466, filed Apr. 9, 1973, which in turn is a continuation of application, Ser. No. 117,760, filed Feb. 22, 1971, and which are both now abandoned.

This invention relates to a polyacetal composition having a good whiteness and an excellent heat stability.

It is known that the polyacetal resin (polyoxymethylene) can be prepared by polymerizing formaldehyde or its cyclic oligomer (trioxane or tetraoxane) and then subjecting the resulting polymer to various treatments of its terminal group, and a molding composition can be prepared by mixing an antioxidant, a heat stabilizer or other various stabilizers with the treated polymer.

In the preparation of the polyacetal resin, it is a necessary and important factor to incorporate various stabilizers to a polyacetal resin to improve the quality of the resin, in addition to the treatment of the terminal groups of the polyacetal resin, and heretofore various proposals have been made.

An object of the present invention is to provide a composition of high molecular weight polyacetal resin having a remarkably improved whiteness and heat stability.

Other object of the present invention is to provide a stabilizer capable of being added to a polyacetal resin to prepare a more stable composition than the conventional ones.

Further objects of the present invention will be apparent from the detailed explanation described hereinafter.

As the stabilizer for polyacetal resin, there have generally been known phenolic compounds having complicated structure, aromatic amines, dicyandiamides, ureas, hydrazines, sulfur compounds and polyamides. To produce an excellent commercial polyacetal composition, these stabilizers have never been used alone, but have been usually used in combination of two kinds of stabilizers consisting of phenolic compounds, as an antioxidant, and such nitrogen containing compounds as polyamides or dicyandiamines, as a heat stabilizer.

We have made strenuous studies of a combination of the stabilizers for polyacetal resin, and as a result have found a novel combination of the stabilizers showing quite excellent synergistic effect and accomplished the present invention. More particularly, we have found that a polyacetal composition having an unexpected heat stability can be obtained by using, as a third component, specified dihydroxydiphenyls or bisphenols together with the above two kinds of stabilizers.

It has been already well known that various phenolic compounds are generally used as a stabilizer for the polyacetal resin. However, all kinds of phenolic compounds are not always useful as the stabilizer. U.S. Pat. No. 2,966,476 discloses a suitable phenolic compounds having the following formula:

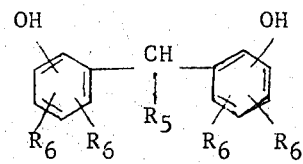

wherein $R_5$ is hydrogen or alkyl of 1 to 3 carbon atoms; and $R_6$ is alkyl of 1 to 5 carbon atoms, that is, the so-called hindered phenols. For example, 4,4'-butylidene-bis-(3-methyl-6-tertbutylphenol) or 2,2'-methylene-bis-(4,6-dimethylphenol), etc. have been particularly recommended. These compounds are special bisphenols characterized by their functions for protecting the oxidation and the discoloration of polyacetal resin. Other phenolic compounds are said to lack in either or both of said characteristics.

It is also known that the amine type stabilizers show an excellent stabilizing effect for polyacetal resin, but they bring about a discoloration to brown or black when used (See U.S. Pat. No. 2,966,476). Further, such well-known antioxidants as urea or hydrazines also give discolored products.

In addition, it is well known that some kinds of specific polyamides are very effective as a stabilizer for polyacetal resin, because their heat stabilizing effect is relatively reliable and long lasting. However, all kinds of polyamides are not always effective. For example, according to U.S. Pat. No. 2,993,025, the terpolymer consisting of 35 percent hexamethylene adipamide, 27 percent hexamethylene sebacamide and 38 percent caprolactam shows a good heat stabilizing effect among the polyamides.

Even said copolyamide showing the above-mentioned excellent heat stability still has great defects. One of the defects is a discoloration. That is, when it is admixed with polyacetal resin, resultant resin composition discolors with elapse of time and the discoloration is remarkable under high temperatures such as molding temperatures.

However, it is found that such disadvantages have been overcome and an unexpected, remarkable stabilization effect can be attained by the present combination of stabilizers.

Thus, according to the present invention, at least one compound is selected from each of the following three groups. The compounds thus selected are admixed with polyacetal resin to prepare the polyacetal composition of the invention. The groups are:

Group 1 Hindered phenolic compounds
Group 2 Nitrogen-containing compounds
Group 3 Dihydroxydiphenyls or bisphenols.

According to the description of the specification of U.S. Pat. No. 2,966,476, which is concerned with the stabilization of polyacetal resin by way of a phenolic antioxidant, all hindered phenolic compounds belonging to Group 1 cannot be used in combination with terpolyamide belonging to Group 2, because of poor stabilizing effect and discoloration. Representative examples of such hindered phenolic compounds include 2,2'-methylene-bis-(4-methyl-6-tert. butylphenol), 2,2'-methylene-bis-(4-ethyl-6-tert.butylphenol), 4,4'-methylene-bis-(2,6-di-tert.butylphenol), 2,2'-butylidene-bis-(4-tert.butyl-6-methylphenol) and compounds having following formula:

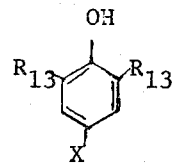

(wherein $R_{13}$ is alkyl of 1 to 5 carbon atoms and X is hydrogen, hydroxy or alkyl of 1 to 5 carbon atoms)

However, it is surprising that the addition of dihydroxydiphenyls or bisphenols or derivatives thereof belonging to Group 3 as a third component makes it effective to use such hindered phenolic compounds belonging to Group 1 together with the compounds belonging to Group 2.

The phenolic compounds of Group 1 relevant to one component of the stabilizers of the present invention are so-called hindered phenols represented by the following formula (I):

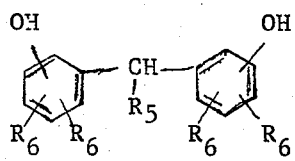
(I)

wherein $R_5$ is hydrogen or alkyl of 1 to 3 carbon atoms; and $R_6$ is alkyl of 1 to 5 carbon atoms; for example, 4,4'-ethylidene-bis-(2-methyl-6tert.butylphenol), 4,4'-butylidene-bis-(3-methyl-6-tert.butylphenol) or 2,2'-methylene-bis-(3-methyl-6-isopropylphenol), 2,2'-methylene-bis-(4-methyl-6-tert.butylphenol), 2,2'-methylene-bis-(4-ethyl-6-tert.butylphenol), 4,4'-methylene-bis-(2,6-di-tert.butylphenol) and 2,2'-butylidene-bis-(4-tert.butyl-6-methylphenol); the following formula (II):

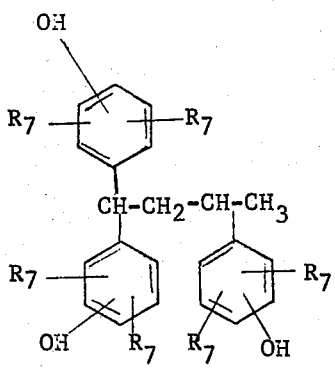
(II)

wherein $R_7$ is alkyl of 1 to 5 carbon atoms; for example, 1,1,3-tris-(2-methyl-4-hydroxy-5-tert.butylphenyl)butane; the following formula (III):

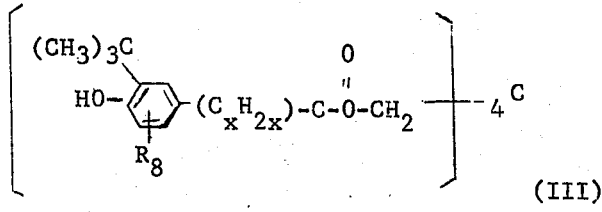
(III)

wherein $R_8$ is alkyl of 1 to 5 carbon atoms, and X is an integer of 1 to 6, preferably 2; for example, pentaerythrityltetra-2-(3,5-di-tert.butylphenyl)propionate; the following formula (IV):

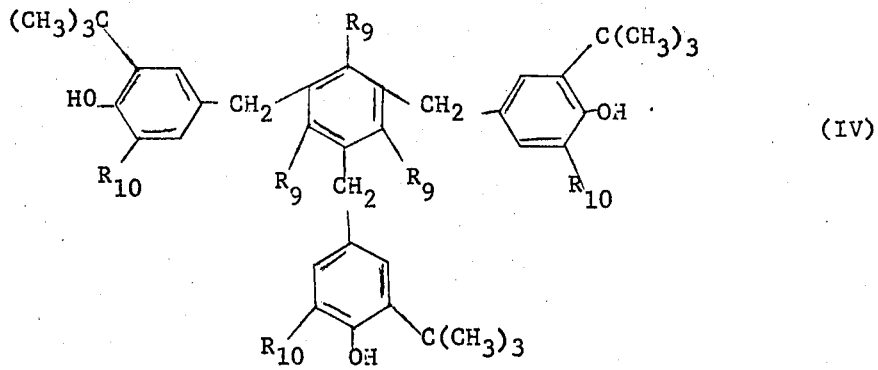
(IV)

wherein $R_9$ is hydrogen or methyl, and $R_{10}$ is hydrogen or alkyl of 1 to 4 carbon atoms; for example, 1,3,5-tris-(3',5'-di-tert.butyl-4'-hydroxybenzyl)2,4,6-trimethylbenzene; the following formula (V):

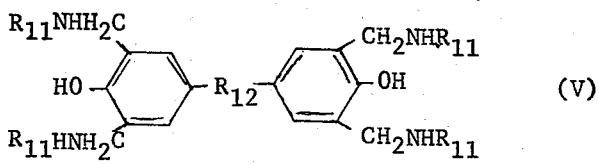
(V)

wherein $R_{11}$ is hydrogen, alkyl of 1 to 5 carbon atoms or alkenyl of 3 to 4 carbon atoms; and $R_{12}$ is alkylidene of 1 to 8 carbon atoms; for example, 6,6'-methylene-bis ($\alpha,\alpha'$-diamino-2,4-xylenol), 6,6'-ethylidene-bis ($\alpha,\alpha'$-diamino-2,4-xylenol), 6,6'-propylidene-bis ($\alpha,\alpha'$-diamino-2, 4-xylenol), 6-6'-butylidene-bis ($\alpha,\alpha'$-diamino-2,4-xylenol) and 4,4'-butylidene-bis ($\alpha,\alpha'$-diamino-2,4-xylenol); and the following formula (VI):

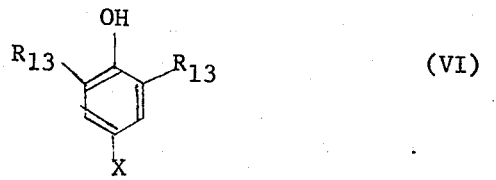
(VI)

wherein $R_{13}$ is alkyl of 1 to 5 carbon atoms; and

X is hydrogen, hydroxy, or alkyl of 1 to 5 carbon atoms; for example: 2,6-di-tert.butylphenol, 2,6-di-tert.butyl-4-methylphenol; 2,6-di-tert.butylhydroquinone and 2,6-di-tert.amylhydroquinone.

Further, in addition to these phenolic compounds, the formates of the compounds as represented by the formulae I–III and V–VI, for example, 2,6-di-tert.butyl-4-methyl-1-formyloxybenzene, 4,4'-butylidene-bis(3-methyl-6-tert.butyl-1-formyloxybenzene) and 1,1,3-tris(2-methyl-4-formyloxy-5-tert.butylphenol)butane, may be used.

Th compounds of Group 1 are so-called hindered phenols whose antioxidant properties for various polymers have been well recognized, that is, the phenolic compounds whose at least one hydrogen atom at the ortho positions to the hydroxyl group is substituted by alkyl group.

Quite different from other polymers, polyacetal resin is required to be stabilized by means of a nitrogencontaining compounds. The stabilizing effect thereof cannot be explained clearly, but there is such a hypothesis that the nitrogen-containing compounds act as an acceptor for monomeric formaldehyde or for a very small amount of acids present or formed in polyacetal resin.

The nitrogen-containing compounds of Group 2, used as one component of the stabilizers of the present invention, include polyamides [for example, terpolyamides consisting of hexamethylene adipamide, hexamethylene sebacamide and caprolactam (U.S. Pat. No. 2,993,025); polyamides consisting of caprolactam and hexamethylene sebacamide (J. Poly. Sci.2, 412 (1947)], polyester amides prepared from caprolactone and caprolactam (Jap. Pat. No. 573,915 and U.S. Pat. No. 3,592,873); polyester amides described in the claim of U.S. Pat. No. 3,355,514; polycondensates prepared from dicarboxylic acid dihydrazide or substances capable of yielding a dicarboxylic acid dihydrazide, urea and aliphatic diamines (Dutch Pat. No. 6,818,620); uracyls, amidines, cyanoguanidines, polyurethanes, polyureas, polyamide-ureas, polyurethaneamides, and polyaminotriazols, and copolymers or mixture of these compounds. Other known synthetic polyamides and copolyamides are also useful.

According to the present invention, the nitrogen-containing compounds prepared by polycondensating dicarboxylic acid dihydrazide, urea and diamine are particularly excellent.

The compounds of Group 3 used as one component of the stabilizers of the present invention are dihydroxy diphenyls or bisphenols compounds as represented by the following formulae (VII) and (VIII), respectively:

(VII)

wherein $R_1$ is hydrogen or alkyl group having 1 to 5 carbon atoms, preferably hydrogen, and

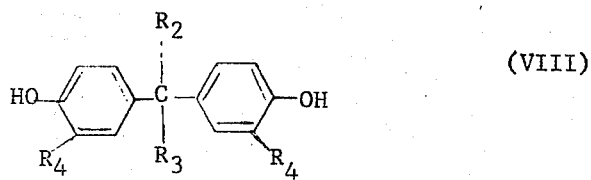
(VIII)

wherein
$R_2$ and $R_3$ are each independently hydrogen or alkyl of 1 to 6 carbon atoms, or form a saturated homocyclic ring; and
$R_4$ is hydrogen or alkyl of 1 to 4 carbon atoms, and preferably hydrogen;
for example, 4,4'-dihydroxydiphenyl, 4,4'-dihydroxydiphenylmethane, 4,4'-dihydroxydiphenyl-1,1-ethane, 4,4'-dihydroxydiphenyl-1,1-propane, 4,4'-dihydroxydiphenyl-1,1-n-butane, 4,4'-dihydroxydiphenyl-1,1-heptane, 4,4'-dihydroxydiphenyl -2,2-propane, 4,4'-dihydroxydiphenyl-2,2-butane and 4,4'-dihydroxy-3,3-dimethylphenyl-2,2-propane.

The compounds of Group 3 alone have no or only poor effectiveness as the antioxidant. However, it has been experimentally found that by using the compounds of Group 3 together with said phenolic compounds of Group 1 and said nitrogen-containing compounds of Group 2 at the same time, excellently stabilized polyacetal compositions may be obtained, as compared with the two component stabilizers consisting of the compounds of Group 1 and Group 2, or Group 1 and Group 3, or Group 2 and Group 3.

It is surprising that among the compounds of Group 3, there are included those phenolic compounds which are not the so-called hindered phenols; namely, they exert a high synergistic effect by using together with the compounds of Groups 1 and 2. The compounds of Group 3 are different from phenolic compounds of Group 1.

In the present invention, phenolic compounds of Group 1 are used in an amount of 0.01 to 3 percent by weight on the basis of the weight of polyacetal. The use of a large amount of said phenolic compounds gives no trouble to the stabilization effect, but from the economical view point 0.01 to 0.5 percent by weight of the phenolic compounds are preferably used. On the other hand, nitrogen-containing compounds of Group 2 are used in an amount of 0.1 to 10 percent by weight, preferably 0.1 to 3 percent by weight on the basis of the weight of polyacetal. Further, dihydroxydiphenyls or bisphenol compounds of Group 3 are used in an amount of 0.001 to 3 percent by weight on the basis of the weight of polyacetal.

The polyacetal whose heat stability can be remarkably improved by the application of the present invention includes polyoxymethylene homopolymer having a degree of polymerization of 500 or more, prepared by polymerizing formaldehyde or its cyclic oligomer and then subjecting the resulting polymer to end capping such as etherifying or esterifying and polyoxymethylene copolymers having the same degree of polymerization as mentioned above, prepared by copolymerizing formaldehyde or its cyclic oligomer with a comonomer capable of copolymerizing with formaldehyde or its cyclic oligomer and then subjecting the resulting copolymer to end capping such as etherifying, esterifying or converting the unstable terminal oxymethylene units to units other than oxymethylene units by the heat treatment or hydrolysis treatment. Representative examples are polyoxymethylene diacetate, polyoxymethylene dimethylether, polyoxymethylene diethylether, copolymers of trioxane and dioxolane, and copolymers of trioxane and styrene.

Generally, it is well known that the stabilizers for polyoxymethylene homopolymer are often found quite or almost unsuitable for the stabilizers for polyoxymethylene copolymer, and further that the reverse cases are often encountered. Surprising enough, however, the novel combination of the stabilizers of the present invention shows a large synergistic effect upon the stabilization of any of polyoxymethylene homopolymers and polyoxymethylene copolymers.

Now, the present invention will be explained, referring to examples, but the present invention will not be restricted to these examples.

In the following examples, all percent and part show percent by weight and part by weight, respectively.

R (percent) shows a residual percentage of the polyacetal composition after the heat treatment of the polyacetal composition at 222°C in the air for 60 minutes, and the resistance to light shows a change after the irradiation for 300 hours by the standard fade meter.

Z value shows the degree of whiteness of the polyacetal measured by Hunter's color-meter. $K_{222}$ value shows the reaction rate constant of polymer for thermal degradation measured by the method described in U.S. Pat. No. 2,964,500 and 2,998,409.

EXAMPLES 1-12

Specified amounts of various stabilizers as shown in Table 1 are added to and mixed with polyoxymethylene diacetate prepared by polymerizing formaldehyde and acetylating the resulting polymer with acetic anhydride (reduced viscosity measured at 60°C in a solution mixture of equal amounts of tetrachloroethane and p-chlorophenol: 2.00 and $K_{222}$:0.05), and then the mixture is mixed for 20 minutes by means of a double cone blender. The resulting mixture is vacuum-dired at 60°C for 6 hours. Then, a molded plate having a thickness of 0.5 mm is prepared by a test hot press at a temperature of 190°C, and subjected to measurement of the heat stability. The results are shown in Table 1 together with the results of comparative tests.

Table 1

| No. Comparative Test | Name of additive compound | Amount of additive added, % | R(%) | Resistance to light |
|---|---|---|---|---|
| 1 | 4,4'-dihydroxydiphenyl-2,2-propane | 0.1 | 85.3 | No change |
| 2 | 2,6-di-tert.butyl-4-methylphenol | 0.5 | 89.0 | '' |
| 3 | 4,4'-butylidene-bis-(3-methyl-6-tert.butylphenol) | 0.5 | 89.0 | '' |
| 4 | 2,2'-methylene-bis-(4-methyl-6-tert.butylphenol) | 0.5 | 90.2 | Slightly red |
| 5 | 1,1,3-tris(2-methyl-4-hydroxy-5-tert.butylphenyl)butane | 0.5 | 92.0 | '' |
| 6 | 1,3,5-trimethyl-2,4,6-tris-(3,5-di-tert.butyl-4-hydroxy-benzyl)benzene | 0.5 | 89.5 | '' |
| 7 | 2,2'-methylene-bis-(4-methyl-6-tert.-butylphenol) formate | 0.5 | 91.8 | '' |
| 8 | Terpolyamide (A) | 1.0 | 86.5 | Slightly yellow |
| 9 | Nitrogen-containing compound (B) | 1.0 | 91.5 | No change |
| 10 | Polyester amide (C) | 1.0 | 89.3 | '' |
| 11 | Diphenylamine | 0.1 | 90.3 | Changed to brown |
| 12 | 4,4'-dihydroxydiphenyl-2,2-propane<br>Terpolyamide (A) | 0.1<br>1.0 | 92.5 | Slightly yellow |
| 13 | Diphenylamine<br>Terpolyamide (A) | 0.1<br>1.0 | 93.8 | Changed to brown |
| 14 | 2,6-di-tert.butyl-4-methylphenol<br>Terpolyamide (A) | 0.5<br>1.0 | 96.0 | Slightly yellow |
| 15 | 4,4'-butylidene-bis-(3-methyl-6-tert.butylphenol)<br>Terpolyamide (A) | 0.5<br>1.0 | 94.9 | No change |
| 16 | 2,6-di-tert.butyl-4-methylphenol<br>Nitrogen-containing compound (B) | 0.5<br>1.0 | 96.3 | No change |
| 17 | 4,4'-butylidene-bis-(3-methyl-6-tert.butylphenol)<br>Nitrogen-containing compound (B) | 0.5<br>1.0 | 96.4 | '' |
| 18 | 2,6-di-tert.butyl-4-methylphenol<br>Polyester amide (C) | 0.5<br>1.0 | 96.8 | '' |
| 19 | 1,1,3-tris-(2-methyl-4-hydroxy-5-tert.butylphenyl) butane<br>Polyester amide (C) | 0.5<br>1.0 | 96.5 | '' |

Table 1—Continued

| No. Comparative Test | Name of additive compound | Amount of additive added, % | R(%) | Resistance to light |
|---|---|---|---|---|
| 20 | Diphenyl amine | 0.1 | | |
| | 4,4'-butylidene-bis(3-methyl-6-tert.butylphenol) | 0.5 | | Changed to |
| | Terpolyamide (A) | 1.0 | 98.5 | brown |
| 21 | N,N'-difurfuryl dithioxide | 1.0 | | |
| | 4,4'-butylidene-bis(3-methyl-6-tert.butylphenol) | 0.3 | | Impossible |
| | Dilauryl-3,3'-thiodipropionate | 0.1 | 84.0 | to mold |
| 22 | N-vinylpyrrolidone-vinylacetate copolymer (70:30) | 1.5 | | |
| | 4,4'-butylidene-bis(3-methyl-6-tert.butylphenol) | 0.3 | | Changed to |
| | Dilauryl-3,3'-thiodipropionate | 0.4 | 93.0 | yellow |
| 23 | Ni complex salt of 1,2,3-benzotriazole | 2.0 | | |
| | Bis(4-hydroxy-5-tert.butyl-2-methylphenyl) sulfide | 0.5 | | Impossible |
| | Dioctadecyl disulfide | 0.5 | 62.5 | to mold |
| 24 | Condensate of 3 moles of 3-methyl-6-tert.butylphenol and 1 mole of crotonaldehyde | 0.25 | | |
| | Hexamethylenediamine | 0.13 | | Impossible |
| | β,β'-thiodipropionic acid | 0.13 | 87.6 | to mold |
| 25 | Terpolyamide (A) | 1.5 | | |
| | 2,2'-methylene-bis(4-methyl-6-tert.butylphenol) | 0.3 | | Slightly |
| | Dilauryl-3,3'-thiodipropionate | 0.1 | 98.0 | yellow |
| 26 | O-hydroxyacetanilide | 0.5 | | |
| | 2,2'-methylene-bis(4-methyl-6-tert.butylphenol) | 0.5 | | Slightly |
| | Polycaprolactam | 1.0 | 96.3 | yellow |
| 27 | N-cyanoacetohydrazide | 0.5 | | |
| | 2,2'-methylene-bis(4-methyl-6-tert.butylphenol) | 0.5 | | Slightly |
| | Polycaprolactam | 1.0 | 97.5 | yellow |
| 28 | p-hydroxydiphenyl | 0.1 | | |
| | 2,2'-methylene-bis(4-methyl-6-tert.butylphenol) | 0.5 | | Changed to |
| | Terpolyamide (A) | 1.0 | 97.8 | yellow |
| 29 | 4,4'-butylidene-bis(3-methyl-6-tert.butylphenol) | 0.1 | | |
| | 2,2'-methylene-bis(4-methyl-6-tert.butylphenol) | 0.5 | | |
| | Terpolyamide (A) | 1.0 | 98.4 | No change |
| 30 | 2,6-di-tert.butylphenol | 0.1 | | |
| | 2,2'-methylene-bis(4-methyl-6-tert.butylphenol) | 0.5 | | Changed to |
| | Terpolyamide (A) | 1.0 | 97.6 | yellow |
| 31 | 4,4'-thio-bis-(3-methyl-6-tert.butylphenol) | 0.1 | | |
| | 2,6-di-tert.butyl-4-methylphenol | 0.5 | | |
| | Nitrogen-containing compound (B) | 1.0 | 97.1 | Changed to grey |

Table 1—Continued

| No. Comparative Test | Name of additive compound | Amount of additive added, % | R(%) | Resistance to light |
|---|---|---|---|---|
| 32 | 4,4'-butylidene-bis(3-methyl-6-tert.butylphenol) | 0.1 | | |
| | 2,6'-di-tert.butyl-4-methylphenol | 0.5 | | |
| | Nitrogen-containing compound (B) | 1.0 | 98.8 | No change |
| 33 | 2,6-di-tert.butyl hydroquinone | 0.1 | | |
| | 2,6-di-tert.butyl-4-methylphenol | 0.5 | | |
| | Nitrogen-containing compound (B) | 1.0 | 97.4 | Changed to yellow |
| 34 | 4,4'-butylidene-bis-(3-methyl-6-tert.butylphenol) | 0.6 | 90.1 | No change |
| 35 | 2,2'-methylene-bis-(4-methyl-6-tert.butylphenol) | 0.6 | 90.2 | Slightly red |
| 36 | 4,4'-dihydroxydiphenyl-2,2-propane | 0.6 | 87.5 | No change |
| 37 | 4,4'-butylidene-bis-(3-methyl-6-tert.butylphenol) | 0.6 | 95.2 | No change |
| | Terpolyamide (A) | 1.0 | | |
| 38 | 2,2'-methylene-bis-(4-methyl-6-tert.butylphenol) | 0.6 | 96.0 | Changed to yellow |
| | Terpolyamide (A) | 1.0 | | |
| 39 | 4,4'-dihydroxydiphenyl-2,2-propane | 0.6 | 92.9 | Slightly yellow |
| | Terpolyamide (A) | 1.0 | | |
| 40 | 4,4'-dihydroxydiphenyl | 0.6 | 93.8 | No change |
| | Terpolyamide (A) | 1.0 | | |

| Example | Name of additive compound | Amount added, % | R(%) | Resistance to light |
|---|---|---|---|---|
| 1 | 4,4'-dihydroxydiphenyl-2,2-propane | 0.1 | | |
| | 4,4'-butylidene-bis(3-methyl-6-tert.butylphenol) | 0.5 | | |
| | Terpolyamide (A) | 1.0 | 98.9 | No change |
| 2 | 4,4'-dihydroxydiphenyl-2,2-propane | 0.1 | | |
| | 2,6-di-tert.butyl 4-methylphenol | 0.5 | | |
| | Polyester amide (C) | 1.0 | 99.0 | No change |
| 3 | 4,4'-dihydroxydiphenyl-2,2-propane | 0.1 | | |
| | 2,2'-methylene-bis(4-methyl-6-tert.butylphenol) | 0.5 | | |
| | Nitrogen-containing compound (B) | 1.0 | 99.1 | No change |
| 4 | 4,4'-dihydroxydiphenyl-2,2-propane | 0.1 | | |
| | 2,2'-methylene-bis(4-methyl-6-tert.butylphenol) formate | 0.5 | | |
| | Nitrogen-containing compound (B) | 1.0 | 99.0 | No change |
| 5 | 4,4'-dihydroxydiphenyl | 0.1 | | |
| | 2,6-di-tert.butyl-4-methylphenol | 0.5 | | |
| | Nitrogen-containing compound (B) | 1.0 | 99.2 | No change |
| 6 | 4,4'-dihydroxydiphenyl-methane | 0.1 | | |
| | 2,6-di-tert.butyl-4-methylphenol | 0.5 | | |
| | Nitrogen-containing compound (B) | 1.0 | 99.0 | No change |
| 7 | 4,4'-dihydroxydiphenyl-2,2-propane | 0.1 | | |
| | 1,3,5-trimethyl-2,4,6-tris-(3,5-di-tert.butyl)-4-hydroxybenzyl)benzene | 0.5 | | |
| | Polyester amide (C) | 1.0 | 98.7 | No change |
| 8 | 4,4'-dihydroxydiphenyl-methane | 0.1 | | |
| | 4,4'-butylidene-bis-(3-methyl-6-tert.butylphenol) | 0.5 | | |
| | Terpolyamide (A) | 1.0 | 98.9 | No change |
| 9 | 4,4'-dihydroxydiphenyl-1,1-ethane | 0.1 | | |
| | 4,4'-butylidene-bis-(3-methyl-6-tert.butylphenol) | 0.5 | | |
| | Terpolyamide (A) | 1.0 | 98.8 | No change |
| 10 | 4,4'-dihydroxydiphenyl | 0.1 | | |
| | 4,4'-butylidene-bis-(3-methyl-6-tert.butylphenol) | 0.5 | | |
| | Terpolyamide (a) | 1.0 | 99.0 | No change |
| 11 | 4,4'-dihydroxydiphenyl-2,2-propane | 0.1 | | |
| | 2,2'-methylene-bis-(4-methyl-6-tert.butylphenol) | 0.5 | | |
| | Terpolyamide (A) | 1.0 | 99.1 | No change |
| 12 | 4,4'-dihydroxydiphenyl-2,2-propane | 0.1 | | |
| | 2,2'-methylene-bis-(4-ethyl-6-tert.butylphenol) | 0.5 | | |
| | Terpolyamide (A) | 1.0 | 99.0 | No change |

A: terpolyamide, that is, a copolymer consisting of 35 percent hexamethylene adipamide, 27 percent hexamethylene sebacamide and 38 percent caprolactam.

B: polycondensate of dicarboxylic acid dihydrazide, hexamethylene diamine and urea; that is, a nitrogen-containing polycondensate having a colorless, transparent appearance and a softening point of 140°C to 160°C, obtained by placing 20 parts of sebacic acid dihydrazide, 20 parts of adipic acid dihydrazide, 15 parts of hexamethylene diamine and 60 parts of urea in a 300-c.c., three-necked flask, melting the mixture at 200°C in a nitrogen gas stream with stirring to effect reaction while heating the mixture for 120 minutes, then connecting the reaction system to a vacuum line under 0.5 mm Hg and further heating the mixture at 200°C for 240 minutes to effect the reaction.

C: polyester amide, that is, a polyester amide having a melting point of about 200°C, prepared by dissolving 90 parts of caprolactam and 10 parts of caprolactone in 400 parts of dehydrated toluene, effecting polymerizing at 110°C for 5 hours using 3 percent by mole of ethylmagnesium bromide and 3 percent by mole of N-acetylcaprolactam as a catalyst on the basis of the monomers, washing the resulting white powders with an aqueous 1 percent hydrochloric acid solution, repeating water washing until the washings exhibit the neutrality and drying the washed powders.

EXAMPLE 13

129 parts of tetradecanedioic acid dihydrazide, 30 parts of hexamethylenediamine and 50 parts of urea are placed into a three-necked flask having a capacity of 500 cc and subjected to reaction by heating at 210°C in a nitrogen gas stream for 120 minutes. In another threenecked flask having a capacity of 300 cc, 100 parts of sebacic acid dihydrazide, 25 parts of tetramethylene diamine and 40 parts of urea are subjected to reaction by heating at 210°C in a nitrogen gas stream, and the resulting transparent molten product is added to the former flask. The mixture is heating at 210°C under a reduced pressure of 0.5 mm Hg for 300 minutes to complete the reaction, whereby a white, semi-transparent, nitrogen-containing polycondenstate is obtained.

The esterified polyoxymethylene homopolymer used in Example 1–12 is mixed with 0.8 percent of said nitrogen-containing polycondenstate, 0.1 percent of 4,4'-dihydroxydiphenyl-2,2-propane, and 0.5 percent of 2,6-di-tert.butyl-4-methylphenol by means of a Henschel mixer having a capacity of 150 l at 40°C for 10 minutes.

Then, pelletizing is carried out by means of an extruder having a cylinder temperature of 200°C. R (percent) and Z of the pellets are 99.3 percent and 99, and R (percent) and Z of the pellets obtained by four repetitions of the pelletizing under the same conditions are 98.7 percent and 97, respectively.

On the other hand, the same polyoxymethylene homopolymer is mixed with 1.0 percent of terpolyamide (A) consisting of 35 percent hexamethylene adipamide, 27 percent hexamethylene sebacamide and 33 percent caprolactam, 0.1 percent of diphenylamine and 0.5 percent of 4,4'-butylidene-bis(3-methyl-6-tert.butylphenol) for comparison. Then pelletizing is carried out in the same manner as described in the above Example. R (percent) and Z of the pellets are 98.5 percent and 98 and R (percent) and Z of pellets obtained by four repetitions of the pelletizing under the same conditions are 97.0 percent and 92, respectively.

EXAMPLE 14

About 0.1 g of boron trifluoride gas is added to a flask containing 55 cc of isobutylene and being kept at −70°C, and dehydrated formaldehyde vapor is passed through the flask, while stirring the mixture for about 10 minutes. The resulting product is filtered and dried. The thus obtained polyoxymethylene copolymer is treated in anhydrous acetic acid in the presence of sodium acetate, whereby the copolymer is acetylated.

The resulting esterified copolymer is mixed with 0.8 percent of a nitrogen-containing compound (B), 0.05 percent of 4,4'-dihydroxydiphenyl-2,2-propane and 0.4 percent of 2,6-ditert.butyl-4-methylphenol, and then the mixture is extruded from a small extruder at a cylinder temperature of 195°C to prepare pellets. The heat stability, R (percent) of the pellets is 99.3 percent.

EXAMPLE 15

A mixture of 500 parts of polyoxymethylene copoylmer containing 3.1 percent of the monomer units derived from dioxolane, 1000 parts of water and 150 parts of triethanolamine are heated in a tightly sealed autoclave at 140° to 150°C for 2 hours 15 minutes. At the end of said period, the autoclave is cooled to room temperature and opened. The resulting copolymer is washed with acetone and successively with hot water, and then dried.

The resulting copolymer is mixed with 0.1 percent of dicyandiamide, 0.3 percent of 2,2'-methylene-bis(4-methyl-6-tert.butylphenol) formate, and 0.08 percent of 4,4'-dihydroxydiphenyl-2,2-propane, and then the thus obtained mixture is pulverized in a heating room having a mixer provided with sigma-type blades at a temperature of 200° to 205°C for 45 minutes. The heat stability, R (percent), of the pulverized composition is 99.4 percent and the whiteness value, Z, is 99, respectively. The R (percent) of the composition containing no 4,4'-di-hydroxydiphenyl-2,2-propane is 98.0 percent in the above example.

EXAMPLE 16

230 parts of sebacic acid dihydrazide is placed in a three-necked flask having a capacity of 1,000 cc, and heated to 200° to melt while stirring the content in a nitrogen stream. Then, 30 parts of urea and 116 parts of hexamethylenediamine are added thereto and subjected to reaction at a reaction temperature of 190°C by heating for 300 minutes. Colorless, transparent reaction solution has a gradually increased viscosity, and at the final stage of the reaction, the solution becomes turbid and then turns to a semi-transparent, viscous solution. Then, the reaction system is brought into a vacuum of 1 mm Hg, and the reaction temperature is increased to 200°C. Then, the reaction is further carried out by heating for 300 minutes to complete the reaction, whereby 220 parts of white block polycondensate having a elemental analytical values of 53.71 percent carbon, 7.69 percent hydrogen and 24.55 percent nitrogen is obtained.

The resulting polycondensate softens and melts at about 195°C, and a transparent, colorless, beautiful film or sheet can be prepared by compression molding using hot presses. The polycondensate can be also made into a film by dissolving the same in dimethylsulfoxide or methanol and evaporating the solvent to dryness, and also the polycondensate can be finely pulverized by pouring the same into such a non-solvent as dioxane. The specific viscosity of the polycondensate measured at 30°C in methanol is 0.30.

Polyoxymethylene diacetate having an intrinsic viscosity of 2.10 and $K_{222}$ of 0.03 is mixed with 0.8 percent of said finely pulverized polycondensate powders, 0.5 percent of 4,4'-butylidene-bis(3-methyl-6-tert.butylphenol) formate, 0.1 percent of 4,4'-dihydroxydiphenyl-2,2-propane and 0.2 percent of titanium white (rutile type), and the resulting polyacetal composition is injection-molded at 190°C, whereby a thin sheet having a thickness of 3 mm is prepared.

The sheet is heat-treated in air at 222°C for 120 minutes, and as a result 1.3 percent of the weight is lost. The whiteness value, Z, is 97 after the heat treatment, whereas it is 99 before the heat treatment.

The molded sheet is pulverized and again injection-molded into the sheet. Even if such operation is repeated four times, no coloring is observed.

EXAMPLES 17–29

A mixture of urea, adipic acid dihydrazide and hexamethylenediamine having a composition ratio as shown in Table 2 is placed in a three-necked flask having a capacity of 300 cc provided with a powerful stirrer, and heated to 200°C in a nitrogen gas stream to melt. The reaction temperature is lowered to 170°C and the reaction is further carried out at 170°C for 300 minutes. The reaction mixture turns to a colorless, semi-transparent very viscous solution.

Then, the reaction system is connected to a vacuum line of 1 mm Hg, and is subjected to reaction by heating at 200°C for further 90 minutes, whereby nitrogen-containing polycondensates having various compositions are obtained.

Polyoxymethylene diacetate having an intrinsic viscosity of 1.60 and $K_{222}$ of 0.03 is mixed with 1.0 percent of any of these nitrogen-containing polycondensates, 0.2 percent of 2,2'-methylene-bis(4-methyl-6-tert.butylphenol) and 0.2 percent of 4,4'-dihydroxydiphenyl-2,2-propane, and the resulting polyacetal composition is injection-molded at 195°C, whereby test pieces are made in order to measure heat stability. The results are shown in Table 2.

Table 2

| Examples | Reaction composition (g) | | | R(%) | Whiteness value, Z |
|---|---|---|---|---|---|
| | Adipic acid dihydrazide | Urea | Hexamethylene-diamine | | |
| 17 | 43 | 30 | 29 | 99.36 | 98 |
| 18 | 46 | 32 | 24 | 99.30 | 98 |
| 19 | 48 | 34 | 19 | 99.25 | 98 |
| 20 | 50 | 35 | 14 | 99.00 | 97 |
| 21 | 55 | 37 | 7 | 99.00 | 97 |
| 22 | 62 | 21 | 33 | 99.40 | 99 |
| 23 | 67 | 23 | 26 | 99.25 | 98 |
| 24 | 72 | 25 | 21 | 99.30 | 99 |
| 25 | 79 | 27 | 11 | 99.10 | 98 |

Table 2-Continued

| Examples | Reaction composition (g) | | | R(%) | Whiteness value, Z |
|---|---|---|---|---|---|
| | Adipic acid dihydrazide | Urea | Hexamethylene-diamine | | |
| 26 | 25 | 42 | 16 | 99.28 | 99 |
| 27 | 35 | 36 | 25 | 99.38 | 98 |
| 28 | 121 | 12 | 11 | 99.00 | 98 |
| 29 | 139 | 6 | 11 | 99.08 | 98 |

EXAMPLE 30

A mixture of 258 parts of tetradecanedioic acid dihydrazide, 276 parts of 3,9-bis-(3-aminopropyl)-2,4,8,10-tetraoxaspiro-[5,5]-undecane and 60 parts of urea is heated in a three-necked flask having a capacity of 1,000 cc at 190°C with stirring. The reaction mixture gradually turns to a viscous molten solution, while evolving a gas. Then, the reaction system is brought into a reduced pressure of 1 mm Hg, and the reaction is carried out at 210°C for 120 minutes to complete the reaction, whereby 360 parts of a nitrogen-containing polycondensate having a white and semi-transparent appearance is obtained.

Polyoxymethylene diacetate having an intrinsic viscosity of 1.80 and $K_{222}$ of 0.02 is well mixed with 1 percent of the resulting polycondensate of tetradecanedioic acid hydrazide and 3,9 -bis-(3-aminopropyl)-2,4,8,10-tetraoxaspiro-[5,5]-undecane, 0.3 percent of 2,6-di-tert.butyl-4-methylphenol and 0.1 percent of 4,-4'-dihydroxydiphenyl-2,2-propane and the mixture is injection-molded at 190°C, whereby a molded piece having a good whiteness is obtained. The heat stability of the piece is 99.36.

EXAMPLES 31–43

174 parts of adipic acid dihydrazide is placed in a three-necked flask having a capacity of 1,000 cc and heated to 200°C in a nitrogen gas stream with stirring to melt the same. Then 60 parts of urea and 116 parts of hexamethylenediamine are added thereto, and the reaction temperature is lowered to 170°C and the reaction is carried out for 5 hours with stirring.

The resulting pre-condensate is divided into 12 parts and then each part is further heated under a reduced pressure of 1 mm Hg under the conditions as shown in Table 3. The results are shown in Table 3.

Polyoxymethylene diacetate having an intrinsic viscosity of 2.10 and $K_{222}$ of 0.03 is well mixed with 0.8 percent of each of the nitrogen-containing polycondensates as shown in Table 3. 0.2 percent of 2,6-di-tert.butyl-4-methylphenol and 0.07 percent of 4,4'-dihydroxydiphenyl-2,2-propane, and the resulting polyacetal composition is extruded at 195°C to pelletize the same. The result is shown in Table 3.

Table 3

| Example | Condensation condition | | Product condensate | | | Composition | |
|---|---|---|---|---|---|---|---|
| | Temperature (°C) | Time (hr) | Yield (%) | Elemental analysis N % | Appearance | R(%) | Whiteness value Z |
| 31 | 190 | 1 | 65 | 25.18 | white, semi-transparent | 99.30 | 97 |
| 32 | 190 | 3 | 63 | 25.72 | colorless, transparent | 99.43 | 98 |
| 33 | 190 | 5 | 60 | 25.99 | colorless, transparent | 99.28 | 98 |
| 34 | 200 | 1 | 62 | 25.79 | white, semi-transparent | 99.20 | 98 |

Table 3 – Continued

| Example | Condensation condition Temperature (°C) | Time (hr) | Yield (%) | Product condensate Elemental analysis N % | Appearance | Composition R(%) | Whiteness value Z |
|---|---|---|---|---|---|---|---|
| 35 | 200 | 3 | 60 | 26.02 | colorless, transparent | 99.21 | 99 |
| 36 | 200 | 5 | 59 | 26.50 | colorless, transparent | 99.05 | 99 |
| 37 | 220 | 0.5 | 65 | 25.20 | white, semi-transparent | 99.0 | 98 |
| 38 | 220 | 1 | 63 | 25.98 | colorless, transparent | 99.40 | 99 |
| 39 | 220 | 3 | 58 | 25.88 | colorless, transparent | 99.41 | 99 |
| 40 | 220 | 5 | 56 | 25.73 | colorless, transparent | 99.36 | 99 |
| 41 | 240 | 0.5 | 53 | 25.80 | colorless, transparent | 99.36 | 99 |
| 42 | 240 | 1 | 53 | 25.78 | colorless, transparent | 99.48 | 99 |
| 43 | 240 | 2 | 51 | 25.86 | colorless, transparent | 99.49 | 99 |

EXAMPLE 44

17.4 parts of adipic acid dihydrazide, 11.6 parts of hexamethylenediamine and 7.1 parts of biuret are placed in a hard glass ampule, and heated at 190°C under an atmospheric pressure for 240 minutes. Then, the ampule is connected to a vacuum line of 1 mm Hg and the heating is further carried out at 220°C for 120 minutes, whereby 22 parts of a white, nitrogen-containing polycondensate having an elemental analysis of 50.55 percent carbon, 7.20 percent hydrogen and 27.80 percent nitrogen is obtained.

Polyoxymethylene diacetate having a softening point of 175°C and an intrinsic viscosity of 2.10 is mixed with 0.8 percent of said polycondensate, 0.4 percent of 2,6-di-tert. butyl-4-methylphenol and 0.1 percent of 4,4'-dihydroxydiphenylmethane and the resulting polyacetal composition is injection-molded at a cylinder temperature of 195°C and a mold temperature of 100°C under an injection pressure of 1,000 kg/cm², whereby a thin sheet having a thickness of 3 mm is prepared. The sheet is heat-treated, as a test piece, in air at 220°C for 120 minutes, and as a result 1.7 percent of the weight is lost. The whiteness value, Z, is 99. The composition after said heat treatment at 220°C is molded into a film under a pressure of 200 kg/cm² by means of a test hot press at 190°C, and the whiteness value, Z, of the thus obtained film is 98.

EXAMPLE 45

Polyoxymethylene diacetate having an intrinsic viscosity of 180 and $K_{222}$ of 0.04 is mixed with 0.7 percent of the nitrogen containing polycondensate described in Example 3, 0.3 percent of 2,2'-butylidene-bis-(2-tert.butyl-4-methylphenol), and 0.1 percent of 4,4'-dihydroxydiphenyl-2,2-propane, and the resulting polyacetal composition is extruded at a cylinder temperature of 195°C by means of a small test extruder having a cylinder inside diameter of 20 mm to pelletize the same. Then, the thus obtained polyacetal pellets are heat-treated in air at 222°C for 120 minutes, whereby 1.0 percent weight is lost, but no discoloration is effected almost at all. On the other hand, the same polyoxymethylene homopolymer is mixed with 0.7 percent of the same nitrogen cntaining polycondensate, 0.3 percent of 2,2'-butylidene-bis-(2-tert.butyl-4-methylphenol) and 0.1 percent of 4,4'-dihydroxy-3,3'-dimethyldiphenyl-2,2-propane and the resulting polyacetal composition is extruded in the same manner as described above. The weight loss of the obtained polyacetal pellets is 1.9 percent.

EXAMPLE 46–56

Various kinds of dicarboxylic acid dihydrazides, diamines and urea or urea derivatives as shown in Table 4 are subjected to reaction according to the same procedure as described in Example 1, whereby the respective nitrogencontaining condensates are synthesized.

Polyoxymethylene diacetate having an intrinsic viscosity of 2.10 and $K_{222}$ of 0.02 is well admixed with 0.7 percent of each said nitrogen-containing polycondensate, 0.4 percent of 2,6-di-tert.butyl-4-methylphenol and 0.05 percent of 4,4'-dihydroxydiphenyl, and the resulting polyacetal composition is extruded at a cylinder temperature of 190°C to pelletize the same. The resulting pellets are subjected to heat stabilization test, and the results are shown in Table 4.

Table 4

| Example No. | Components of charge composition (% by mole) dicarboxylic dihydrazide | acid | diamine | Urea or urea derivatives | Yield (%) | Softening point (°C) | Appearance | Polyacetal composition R(%) | Whiteness value Z |
|---|---|---|---|---|---|---|---|---|---|
| 46 | Sebacic acid dihydrazide | 25 | Bisaminopropylether 25 | Urea 50 | 62 | 100–130 | colorless, transparent | 99.20 | 99 |
| 47 | Suberic acid dihydrazide | 30 | Hexamethylene diamine 20 | Urea 50 | 64 | 140–160 | colorless, transparent | 99.38 | 99 |
| 48 | Oxadivaleric acid dihydrazide | 40 | Pentamethylenediamine 20 | Urea 40 | 67 | 160–180 | colorless, transparent | 99.00 | 98 |

Table 4 — Continued

| Example No. | Components of charge composition (% by mole) | | | Yield (%) | Softening point (°C) | Appearance | Polyacetal composition | |
|---|---|---|---|---|---|---|---|---|
| | dicarboxylic dihydrazide | acid | diamine | Urea or urea derivatives | | | | R(%) | Whiteness value Z |
| 49 | Cyclohexane-dicarboxylic dihydrazide | acid 35 | Hexa-methylene-diamine 20 | Urea 45 | 60 | 140–160 | colorless, semi-transparent | 99.10 | 98 |
| 50 | Sebacic acid dihydrazide | 30 | Hexa-methylene-diamine 25 | Ethylene-urea 45 | 62 | 170–180 | colorless, transparent | 99.20 | 99 |
| 51 | Adipic acid dihydrazide | 25 | Hexa-methylene-diamine 25 | Biurea 50 | 59 | 180–190 | colorless, transparent | 99.31 | 98 |
| 52 | Sebacic acid dihydrazide | 30 | Tetra-methylene diamine 25 | Methylene-bisurea 45 | 60 | 140–160 | colorless, transparent | 99.00 | 99 |
| 53 | Azelaic acid dihydrazide | 40 | Hexa-methylene-diamine 20 | Urea 40 | 59 | 140–180 | colorless, transparent | 99.30 | 99 |
| 54 | Suberic acid dihydrazide | 33 | Nona-methylene-diamine 20 | Thiourea 47 | 62 | 160–190 | white, semi-transparent | 99.10 | 97 |
| 55 | Adipic acid dihydrazide | 35 | Nona-methylene-diamine 20 | Ethylene-thiourea 45 | 58 | 180–200 | white, semi-transparent | 99.08 | 97 |
| 56 | Dimeric acid dihydrazide | 25 | Hexamethy methylene-diamine 25 | Urea 50 | 60 | 170–120 | slightly yellow, transparent | 99.00 | 97 |

EXAMPLE 57

7.5 parts of oxalic acid dihydrazide, 8.6 parts of decamethylenediamine and 6 parts of urea are placed in a hard glass ampule, and heated at 210°C in a nitrogen gas stream for 120 minutes to effect reaction. Then, the ampule is connected to a vacuum line of 0.5 mm Hg and the reaction temperature is elevated to 240°C and the ampule is heated further for 180 minutes. Initially, the reaction is in a white block form, but starts to melt after 120 minutes of the reaction time under a reduced pressure, and turns to a colorless, transparent and very viscous mixture. Finally, 13 parts of a colorless, transparent nitrogen-containing polycondensate is obtained. The nitrogen content thereof is 21.08 percent by analysis. The resulting polymer can be formed in a beautiful film by pressing at 200°C under a pressure of 250 kg/cm² by means of a test hot press.

Polyoxymethylene diacetate having an intrinsic viscosity of 2.30 and $K_{222}$ of 0.07 is mixed with 0.8 percent of said nitrogen-containing polycondensate, 0.3 percent of 2,6-di-tert.butylhydroquinone and 0.2 percent of 4,4′-dihydroxydiphenyl, and the resulting polyacetal composition is extruded at a cylinder temperature of 195°C by means of a small test extruder having a cylinder inside diameter of 20 mm to pelletize the same. Then, the thus obtained polyacetal pellets are heat-treated in air at 222°C for 120 minutes, whereby 1.2 percent weight is lost, but no discoloration is effected almost at all.

Said polyacetal pellets are extruded repeatedly five times under the same cylinder condition to pelletize the same. The whiteness of the resulting pellets is not changed even after the fourth repetition, and the every Z values are all 98. After the fifth pelletization, the Z value turns to 97.

EXAMPLE 58

17 parts of adipic acid dihydrazide, 16 parts of malonic acid dihydrazide, 40 parts of isophoronediamine and 80 parts of biuret are placed in a three-necked flask having a capacity of 300 cc provided with a vigorous stirrer, and heated and molten at 200°C in a nitrogen gas stream, and further subjected to reaction by heating at the same temperature for 300 minutes. The reaction mixture is solidified while evolving the gas. Then, the reaction system is connected to a vacuum line of 1 mm Hg and the mixture is further subjected to reaction by heating at 230°C for 120 minutes. The reaction is gradually molten and turns to a viscous, colorless transparent molten solution, whereby 93 parts of a colorless, transparent, glass-like, nitrogen-containing polycondensate having a nitrogen analysis of 20.68 percent is obtained. Its softening point is 180°C.

Polyoxymethylene dimethylether having an intrinsic viscosity of 2.10 and $K_{222}$ of 0.01 is mixed with 0.9 percent of said nitrogen-containing polycondensate, 0.4 percent of 2,2′-methylene-bis(4-methyl-6-tert.butylphenol) and 0.1 percent of 4,4′-dihydroxydiphenyl-2,2-propane. The resulting polyacetal composition is extruded at a cylinder temperature of 195°C by means of a small test extruder having a cylinder inside diameter of 20 mm to pelletize the same, whereby the pellets having a whiteness value, Z, of 99 are obtained. Then the pellets are heat-treated in air at 222°C for 120 minutes, whereby 1.0 % weight is lost, but no discoloration by the heat treatment is observed almost at all.

EXAMPLES 59–62

Various polyoxymethylene copolymer as shown in Table 5 are mixed with 0.8 percent of a nitrogen-containing polycondensate synthetized from adipic acid dihydrazide, urea and hexamethylenediamine in the same manner as in Example 1 and having an elemental analysis of 56.12 percent carbon, 8.66 percent hydrogen and 20.34 percent nitrogen, 0.3 percent of 2,2′-methylene-bis(4-methyl-6-tert.butylphenol) and 0.1 percent of 4,4′-dihydroxydiphenyl-2,2-propane, and the resulting polyacetal composition is extruded at a cylinder temperature of 185°C to pelletize the same. The resulting pellets are subjected to the heat stabilization test. The results are shown in Table 5. It is seen from these Examples that the heat stabilizers of the present invention are effective upon both polyoxymethylene homopolymer and polyoxymethylene copolymer.

dihydroxydiphenyl-2,2-propane. The resulting polyacetal composition is injection-molded at 195°C under a pressure of 800 kg/cm², whereby a molded article having a good whiteness and a lustrous surface is obtained. The heat stability, R (percent) of the molded article is Table 5

| Example No. | Preparation and properties of polyoxymethylene copolymer | Polyacetal composition | |
|---|---|---|---|
| | | Heat stability R(%), 90 minutes | Whiteness value, Z |
| 59 | A mixture of trioxane and styrene was irradiated with γ-rays of Co⁶⁰ at 0°C in a dosage of $1.2 \times 10^6$ γ, and then was subjected to a post-polymerization at 50°C for 8 hours, whereby a copolymer was obtained. The copolymer was then further acetylated with acetic anhydride. The copolymer had about 3 % styrene content, an intrinsic viscosity of 2.10 and $K_{222}$ of 0.06. | 99.00 | 99 |
| 60 | A mixture of trioxane and acrylamide was irradiated with γ-rays of Co⁶⁰ at 0°C in a dosage of $1.2 \times 10^6$ γ, and then was subjected to a post-polymerization at 50°C for 8 hours, whereby a copolymer having an intrinsic viscosity of 1.80 and $K_{222}$ of 0.04 was obtained. | 99.10 | 99 |
| 61 | Trioxane and dioxane were polymerized at 66°C for 4 hours with boron fluoride etherate, and the thus obtained copolymer was dissolved in benzyl alcohol containing 10 % tributylamine at 145°C to remove unstable terminal units. The copolymer contained 2 % dioxolane and had an intrinsic viscosity of 1.90 and $K_{222}$ of 0.01. | 99.00 | 99 |
| 62 | A copolymer obtained by copolymerization of formaldehyde and dioxolane was dissolved in benzyl alcohol containing 10 % tributylamine at 145°C to remove unstable terminal units. The copolymer contained 1.1 % by mole of dioxolane and had an intrinsic viscosity of 1.90 and $K_{222}$ of 0.01. | 99.18 | 99 |

Example 63

200 parts of dimethyladipate 200 parts of hydrazine hydrate (purity: 90 percent) and hexamethylenediamine, and 600 parts of urea are placed in a stainless steel autoclave provided with a stirrer and subjected to reaction at 180°C under an autogeneous pressure for 180 minutes After the reaction, the autoclave is cooled to 70°C, and the temperature is again gradually elevated, while passing a nitrogen gas through the autoclave. Finally, the mixture is subjected to reaction at 200°C for 120 minutes. Then, the autoclave is subjected to pressure reduction down to 2 mm Hg, and is heated to 210°C for 240 minutes to complete the reaction, whereby 580 parts of colorless, transparent, nitrogen-containing polycondensate having a nitrogen analysis of 25.36 percent is obtained. The resulting polymer can be molded into a film by pressing the same at 170°C under a pressure of 250 kg/cm² by means of a test hot press.

Polyoxymethylene diacetate having an intrinsic viscosity of 1.80 and $K_{222}$ of 0.04 is well mixed with 1.0 percent of said nitrogen-containing polycondensate, 0.3 percent of 1,1,3-tris(2-methyl-4-formyloxy-5-tert.butylphenyl) butane and 0.1 percent of 4,4'-

99.00 and the whiteness value, Z is 99.

Examples 64–69

Various kinds of dicarboxylic acid dihydrazides, diamines and urea or urea derivatives, as shown in Table 6, are placed in the individual hard glass ampules, and heated and molten at 180°C in a nitrogen gas stream. The reaction is further continued at the same temperature as 180°C for 90 minutes. Then, the ampule is connected to a vacuum line of 1 mm Hg, and further reaction is carried out at the same temperature for 180 minutes to remove unreacted and volatile products whereby nitrogen-containing polycondensate is obtained.

Polyoxymethylene diacetate having an intrinsic viscosity of 2.00 and $K_{222}$ of 0.05 is well mixed with 0.8 percent of said nitrogen-containing polycondensate, 0.1 percent of 4,4'-dihydroxydiphenyl-2,2-propane and 0.3 percent of 2,6-di-tert.butyl-4-methylphenol and the resulting polyacetal composition is extruded at a cylinder temperature of 195°C by means of a small test extruder having a cylinder inside diameter of 20 mm to pelletize the same. The thus obtained pellets are subjected to the heat stabilization test. The results are shown in Table 6.

Table 6

| Example No. | Components of charged composition (% by mole) | | | Yield (%) | Softening point (°C) | Appearance | Polyacetal composition | |
|---|---|---|---|---|---|---|---|---|
| | Dicarboxylic acid dihydrazide | Diamine | Urea or urea derivatives | | | | R(%) | Whiteness value, Z |
| 64 | Terephthalic acid dihydrazide 30 | Hexamethylene diamine 20 | Urea 50 | 58 | 180–190 | colorless, transparent | 98.90 | 98 |

Table 6 — Continued

| Example No. | Components of charged composition (% by mole) | | | Urea or urea derivatives | Yield (%) | Softening point (°C) | Appearance | Polyacetal composition | |
|---|---|---|---|---|---|---|---|---|---|
| | Dicarboxylic dihydrazide | acid | Diamine | | | | | R(%) | Whiteness value, Z |
| 65 | Naphthalene dicarboxylic acid dihydrazide 25 | | Ethylenediamine 20 | Biurea 55 | 48 | 190–200 | colorless, transparent | 98.80 | 98 |
| 66 | Decamethylene dicarboxylic acid dihydrazide 33 | | Isophoronediamine 33 | Urea 34 | 50 | 120–140 | colorless, transparent | 99.40 | 99 |
| 67 | Octadecane-1,18-dicarboxylic acid dihydrazide 40 | | Polyethyleneimine having molecular weight of 600 20 | Urea 40 | 62 | 70–90 | slightly yellow, semi-transparent | 98.62 | 98 |
| 68 | Eicosane-1,20-dicarboxylic acid dihydrazide 45 | | Hexamethylenediamine 15 | Urea 40 | 60 | 40–85 | colorless, transparent | 98.89 | 99 |
| 69 | Sebacic acid dihydrazide | | Hexamethylenediamine 20 | Ethylene urea 25 Thiourea 25 | 61 | 110–135 | slightly yellow, semi-transparent | 98.73 | 98 |
|    |                          | 30 |                              |                                |    |         |                                   |       |    |

Example 70

Various amounts of 2,2'-methylene-bis-(4-methyl-6-tert.butylphenol) and 4,4'-dihydroxydiphenyl-2,2-propane are added to the same polymer as in Example 1 and then, the heat stability and resistance to light are measured as in Example 1. The results are shown in Table 7.

Table 7

| Polyester amide (C) | 2,2'-methylene-bis-(4-methyl-6-tert.butyl-phenol) | 4,4'-dihydroxy-diphenyl-2,2-propane | R (%) | Resistance to light |
|---|---|---|---|---|
| 0.3 | 0.5 | 0.1 | 98.7 | No change |
| 9 | 0.5 | 0.1 | 99.0 | No change |
| 1.0 | 2.5 | 0.1 | 99.2 | No change |
| 1.0 | 0.2 | 0.1 | 98.8 | No change |
| 1.0 | 0.5 | 2.5 | 99.1 | No change |

Example 71

Polyoxymethylene copolymer containing 3.1 percent of the monomer units derived from dioxolane is mixed with 0.6 percent of polyester amide (C), 0.3 percent of 2,2'-methylene-bis-(4-methyl-6-tert.butylphenol) formate and 0.08 percent of 4,4'-dihydroxydiphenyl-2,2-propane, and then the mixture is mixed for 20 minutes in a double cone blender and is vacuum-dried at 60°C for 6 hours. Then, a molded plate having a thickness of 0.5 mm is prepared by a test hot press at a temperature of 190°C, and is subjected to measurement of the heat stability and resistance to light. The results are shown in Table 8 together with the results of comparative tests.

Table 8

| No. | Name of additive compound | Amount of additive added (phr) | R(%) | Resistance to light |
|---|---|---|---|---|
| Example 71 | 2,2'-methylene-bis-(4-methyl-6-tert.butylphenol) | 0.3 | 99.4 | No change |
|  | 4,4'-dihydroxydiphenyl-2,2-propane | 0.08 |  |  |
|  | polyester amide (C) | 0.5 |  |  |
| Comparative test 1' | 2,2'-methylene-bis-(4-methyl-6-tert.butylphenol) | 0.38 | 91.3 | No change |
| Comparative test 2' | 4,4'-dihydroxydiphenyl-2,2-propane | 0.38 | 87.5 | No change |
| Comparative test 3' | Polyester amide (C) | 0.5 | 85.0 | No change |
| Comparative test 4' | 2,2'-methylene-bis-(4-methyl-6-tert.butylphenol) Polyester amide (C) | 0.38 0.5 | 97.4 | No change |
| Comparative test 6' | 4,4'-dihydroxydiphenyl-2,2-propane Polyester amide (C) | 0.38 0.5 | 95.0 | No change |

What is claimed is:

1. A polyacetal composition comprising, in admixture, a a polyacetal,
b 0.001 to 3 percent by weight, based on the weight of polyacetal, of a hindered phenolic antioxidant in which at least one hydrogen atom at a position ortho to the phenolic hydroxyl group is substituted by an alkyl group;
c 0.1 to 10 percent by weight, based on the weight of polyacetal, of a nitrogen-containing compound selected from the group consisting of
a. a polyamide
b. A polycondensate of dicarboxylic acid hydrazide, or a substance capable of yielding dicarboxylic acid hydrazide, and urea and an aliphatic diamine,
c. a uracyl,
d. an amidine,
e. a cyanoguanidine,
f. a polyurethane,
g. a polyurea, and
h. a polyaminotriazole; and
d. 0.001 to 3 percent, based on the weight of polyacetal of 4,4'-dihydroxydiphenyl or a bisphenol compound having the formula:

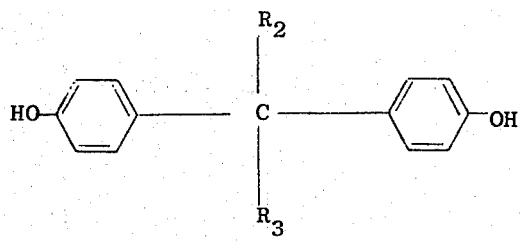

wherein $R_2$ and $R_3$ are each independently hydrogen or alkyl of 1 to 6 carbon atoms, or form a saturated homocyclic ring.

2. A polyacetal composition of claim 1, wherein said hindered phenolic antioxidant is a compound of the formula

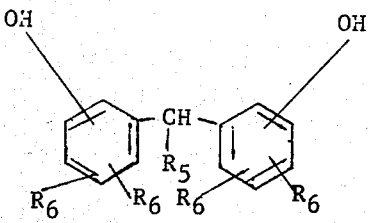

wherein $R_5$ is hydrogen or alkyl of 1 to 3 carbon atoms; and
$R_6$ is alkyl of 1 to 5 carbon atoms, or the formate thereof.

3. A polyacetal composition of claim 1, wherein said hindered phenolic antioxidant is a compound of the formula

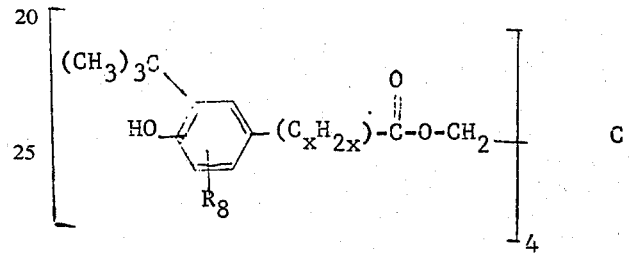

wherein $R_7$ is alkyl of 1 to 5 carbon atoms, or the formate thereof.

4. A polyacetal composition of claim 1, wherein said hindered phenolic antioxidant is a compound of the formula $$\left[ \begin{array}{c} (CH_3)_3C \\ HO-\bigcirc-(C_xH_{2x})-\overset{O}{\underset{\|}{C}}-O-CH_2 \\ R_8 \end{array} \right]_4 C$$

wherein
$R_8$ is alkyl of 1 to 5 carbon atoms, and
x is an integer of 1 to 6, or the formate thereof.

5. A polyacetal composition of claim 4, wherein x is 2.

6. A polyacetal composition of claim 1, wherein said hindered phenolic antioxidant is a compound of the formula

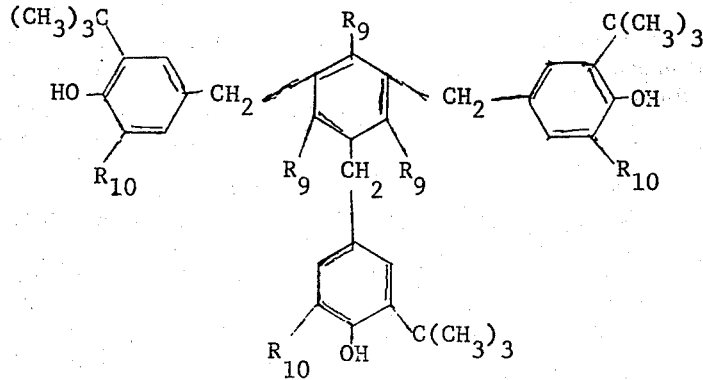

wherein
$R_9$ is hydrogen or methyl, and
$R_{10}$ is hydrogen or alkyl of 1 to 4 carbon atoms.

7. A polyacetal composition of claim 1, wherein said hindered phenolic antioxidant is a compound of the formula

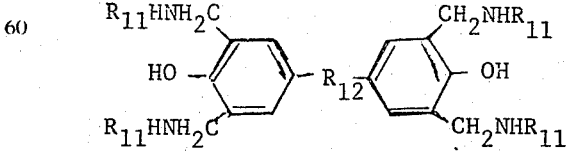

wherein
$R_{11}$ is hydrogen, alkyl of 1 to 5 carbon atoms or alkenyl of 3 to 4 carbon atoms; and
$R_{12}$ is alkylidene of 1 to 8 carbon atoms, or the formate thereof.

8. A polyacetal composition of claim 1, wherein said hindered phenolic antioxidant is a compound of the formula

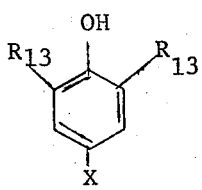

wherein $R_{13}$ is alkyl of 1 to 5 carbon atoms; and

X is hydrogen, hydroxy, or alkyl of 1 to 5 carbon atoms, or the formate thereof.

9. A polyacetal composition according to claim 1, wherein said bisphenol compound is 4,4′-dihydroxydiphenylmethane.

10. A polyacetal composition according to claim 1, wherein said bisphenol compound is 4,4′-dihydroxydipphenyl-1,1-ethane.

11. A polyacetal composition according to claim 1, wherein said bisphenol compound is 4,4′-dihydroxydiphenyl-1,1-propane.

12. A polyacetal composition according to claim 1, wherein said bisphenol compound is 4,4′-dihydroxydiphenyl-1,1-butane.

13. A polyacetal composition according to claim 1, wherein said bisphenol compound is 4,4′-dihydroxydiphenyl-1,1-heptane.

14. A polyacetal composition according to claim 1, wherein said bisphenol compound is 4,4′-dihydroxydiphenol-2,2-propane.

15. A polyacetal composition according to claim 1, wherein said bisphenol compound is 4,4′-dihydryoxydiphenol-2-butane.

16. A polyacetal composition according to claim 1, wherein said nitrogen-containing compound is a polyamide.

17. A polyacetal composition of claim 16, wherein said hindered phenolic antioxidant is a compound of the formula

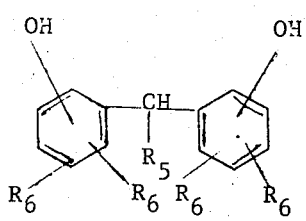

wherein $R_5$ is hydrogen or alkyl of 1 to 3 carbon atoms; and $R_6$ is alkyl of 1 to 5 carbon atoms, or the formate thereof.

18. A polyacetal composition of claim 16, wherein said hindered phenolic antioxidant is a compound of the formula

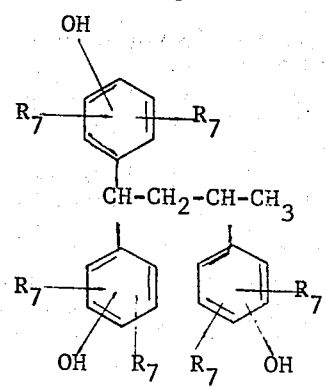

wherein $R_7$ is alkyl of 1 to 5 carbon atoms, or the formate thereof.

19. A polyacetal composition of claim 16, wherein said hindered phenolic antioxidant is a compound of the formula

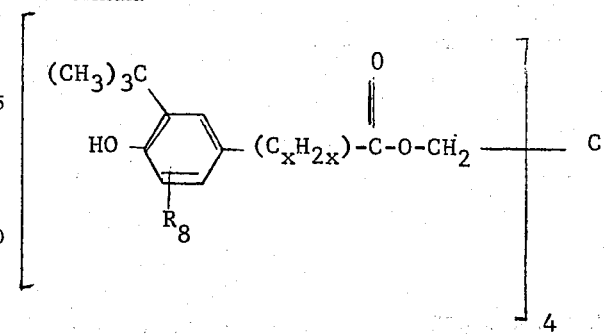

wherein $R_8$ is alkyl of 1 to 5 carbon atoms, and x is an integer of 1 to 6, or the formate thereof.

20. A polyacetal composition of claim 19, wherein x is 2.

21. A polyacetal composition of claim 16, wherein said hindered phenolic antioxidant is a compound of the formula

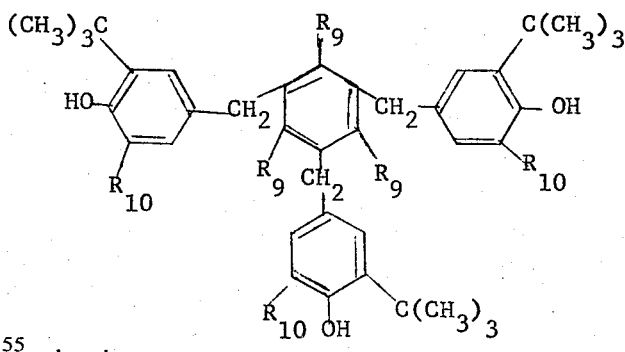

wherein $R_9$ is hydrogen or methyl, and $R_{10}$ is hydrogen or alkyl of 1 to 4 carbon atoms.

22. A polyacetal composition of claim 16, wherein said hindered phenolic antioxidant is a compound of the formula

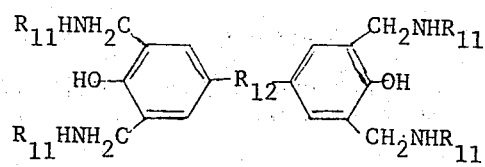

wherein
- $R_{11}$ is hydrogen, alkyl of 1 to 5 carbon atoms or alkenyl of 3 to 4 carbon atoms; and
- $R_{12}$ is alkylidene of 1 to 8 carbon atoms, or the formate thereof.

23. A polyacetal composition of claim 16, wherein said hindered phenolic antioxidant is a compound of the formula

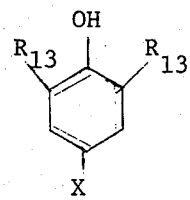

wherein
- $R_{13}$ is alkyl of 1 to 5 carbon atoms; and
- X is hydrogen, hydroxy, or alkyl of 1 to 5 carbon atoms, or the formate thereof.

24. A polyacetal composition according to claim 16, wherein said bisphenol compound is 4,4'-dihydroxydiphenylmethane.

25. A polyacetal composition according to claim 16, wherein said bisphenol compound is 4,4'-dihydroxydiphenyl-1,1-ethane.

26. A polyacetal composition according to claim 16, wherein said bisphenol compound is 4,4'-dihydroxydiphenyl-1,1-propane.

27. A polyacetal composition according to claim 16, wherein said bisphenol compound is 4,4'-dihydroxydiphenyl-1,1-butane.

28. A polyacetal composition according to claim 16, wherein said bisphenol compound is 4,4'-dihydroxydiphenyl-1,1-heptane.

29. A polyacetal composition according to claim 16, wherein said bisphenol compound is 4,4'-dihydroxydiphenyl-2,2-propane.

30. A polyacetal composition according to claim 16, wherein said bisphenol compound is 4,4'-dihydroxydiphenyl-2,2-butane.

31. A polyacetal composition of claim 16 wherein said polyamide is a homopolyamide, a polyester amide, a polyamide urea or a polyurethane amide.

* * * * *